United States Patent
Takamura et al.

(10) Patent No.: US 10,656,552 B2
(45) Date of Patent: May 19, 2020

(54) LIGHT DEFLECTOR, OPTICAL SCANNING DEVICE, AND IMAGE FORMING APPARATUS

(71) Applicant: CANON KABUSHIKI KAISHA, Tokyo (JP)

(72) Inventors: Daisuke Takamura, Fujinomiya (JP); Fumihiko Yamaya, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/170,401

(22) Filed: Oct. 25, 2018

(65) Prior Publication Data
US 2019/0129326 A1 May 2, 2019

(30) Foreign Application Priority Data
Oct. 31, 2017 (JP) .................. 2017-210533

(51) Int. Cl.
*G03G 15/043* (2006.01)
*G02B 26/12* (2006.01)
*G03G 15/04* (2006.01)

(52) U.S. Cl.
CPC ........... *G03G 15/043* (2013.01); *G02B 26/12* (2013.01); *G02B 26/125* (2013.01); *G03G 15/0409* (2013.01); *G02B 26/121* (2013.01)

(58) Field of Classification Search
CPC ........... G03G 15/04036; G03G 15/043; G03G 15/0435; G02B 2006/0098; G02B 26/12
See application file for complete search history.

(56) References Cited

U.S. PATENT DOCUMENTS

| 8,711,196 B2 * | 4/2014 | Chun | ........................ G02B 5/09 347/261 |
| 2017/0097450 A1 * | 4/2017 | Hoshino | ............. B29C 45/0025 |

FOREIGN PATENT DOCUMENTS

| JP | 05-297311 A | | 11/1993 |
| JP | 08-118496 A | | 5/1996 |
| JP | 08-122508 A | | 5/1996 |
| JP | 2619244 B2 | | 6/1997 |
| JP | 2002267988 A | * | 9/2002 |
| JP | 2004117377 A | * | 4/2004 |
| JP | 2015-163921 A | | 9/2015 |
| JP | 2017-72660 A | | 4/2017 |

OTHER PUBLICATIONS

Itami (JP 2004-117377 A), Apr. 2004, JPO Computer Translation (Year: 2004).*

* cited by examiner

*Primary Examiner* — Erika J Villaluna

(74) *Attorney, Agent, or Firm* — Canon U.S.A., Inc. I.P. Division

(57) ABSTRACT

It is desired to reduce deformation of reflecting surfaces of a rotatable polygon mirror that is formed by using resin molding. The rotatable polygon mirror that is formed by resin molding is provided with recesses.

11 Claims, 10 Drawing Sheets

LIGHT DEFLECTOR, OPTICAL SCANNING DEVICE, AND IMAGE FORMING APPARATUS

BACKGROUND

Field

The present disclosure relates to an image forming apparatus, such as a copier, a printer, and a facsimile machine. The present disclosure also relates to a light deflector and an optical scanning device that are used in an image forming apparatus, such as a copier, a printer, and a facsimile machine.

Description of the Related Art

A light deflector disposed in an optical scanning device is equipped with a rotatable polygon mirror that is formed of a metallic material such as aluminum by using high precision machining.

FIG. 9 is a cross-sectional view schematically illustrating an internal structure of a known light deflector. A known light deflector 917 has a rotatable polygon mirror 915 supported by a flange portion 930 that is made of a metallic material. The flange portion 930 serves as a support member.

It requires a considerable man-hours to process a metallic material such as aluminum and produce a workpiece for the rotatable polygon mirror 915 by using a high-precision machining Consequently, attempts have been made in recent years to produce the rotatable polygon mirror 915 by using resin molding (see Japanese Patent Laid-Open Nos. 08-118496, 05-297311, 2015-163921, 08-122508, and 2017-72660, and Japanese Patent Publication No. 2619244). For example, a rotatable polygon mirror illustrated in FIG. 10 is disclosed by Japanese Patent Laid-Open No. 08-118496. Another rotatable polygon mirror illustrated in FIG. 11 is disclosed by Japanese Patent Laid-Open No. 2017-72660.

The rotatable polygon mirror disclosed by Japanese Patent Laid-Open No. 08-118496 includes a plurality of protrusions that abut a flange portion. A plurality of the protrusions is disposed at positions corresponding to the corners of the rotatable polygon mirror at which adjacent reflecting surfaces are joined to each other. The resin material (rotatable polygon mirror) and the metallic material (flange portion) have coefficients of linear expansion that are different from each other. With this configuration, the rotatable polygon mirror reduces the influence of the difference in the coefficient of linear expansion on the reflecting surfaces.

The rotatable polygon mirror disclosed by Japanese Patent Laid-Open No. 05-297311 includes through-holes that are provided in the mounting surface of the rotatable polygon mirror, and an adhesive is injected in the through-holes from the non-mounting surface. This prevents the adhesive from forming a layer over the mounting surface and thereby prevents the mounting surface of the rotatable polygon mirror from being raised.

In a rotatable polygon mirror disclosed by Japanese Patent Laid-Open No. 2015-163921, compensatory deformation is introduced in advance to the reflecting surfaces in the static state so that the reflecting surfaces may be deformed into a desired shape in the dynamic state. The influence of dynamic surface deformation during rotation is thereby compensated.

However, with the configuration according to Japanese Patent Laid-Open No. 08-118496, stress concentration that is generated when the rotatable polygon mirror is press-fitted around the flange portion (i.e., support member) may induce static deformation of the reflecting surfaces. With the configuration according to Japanese Patent Laid-Open No. 05-297311, the amount of dynamic deformation of the rotatable polygon mirror becomes small on the adhesion side (bottom surface) thereof, whereas the amount of dynamic deformation becomes large on the non-adhesion side (top surface), which may cause the reflecting surfaces to incline. With the configuration according to Japanese Patent Laid-Open No. 2015-163921, the amount of dynamic deformation of the central portion of a reflecting surface becomes different with respect to the end portions thereof depending on the rotation rate. This makes it difficult for a single rotatable polygon mirror to work for multiple rotation rates.

Thus, it is desired to provide a light deflector that can reduce deformation of the reflecting surfaces of a rotatable polygon mirror that is formed of resin molding.

SUMMARY

The present disclosure provides a light deflector in which a rotatable polygon mirror formed by using resin molding is provided with recesses.

The present disclosure also provides an optical scanning device and an image forming apparatus.

The present disclosure provides a light deflector that includes a rotatable polygon mirror that is formed by resin molding and has reflecting surfaces that deflect laser light, and a support member that supports the rotatable polygon mirror. In the light deflector, the rotatable polygon mirror is provided with a hole and the hole has an inner surface that surrounds the support member, and the inner surface includes a plurality of protruding portions that protrude from the inner surface toward a rotation center of the rotatable polygon mirror and are in contact with the support member. In addition, the rotatable polygon mirror has recesses that are (i) recessed in a rotational axis direction of the rotatable polygon mirror and (ii) provided at symmetrical positions with respect to a straight line that passes through the rotation center and a portion at which each of the protruding portions is in contact with the support member as viewed in the rotational axis direction.

Further features of the present invention will become apparent from the following description of exemplary embodiments with reference to the attached drawings.

DESCRIPTION OF THE EMBODIMENTS

Embodiments will be described in detail by using examples with reference to the drawings. Note that dimensions, materials, shapes, relative positions, or the like, of elements described in the embodiments below may be changed appropriately in accordance with configurations and various conditions of an apparatus to which the present disclosure is applied. In other words, the embodiments described herein should not be construed as limiting the scope of the invention.

First Embodiment

Figure 1:
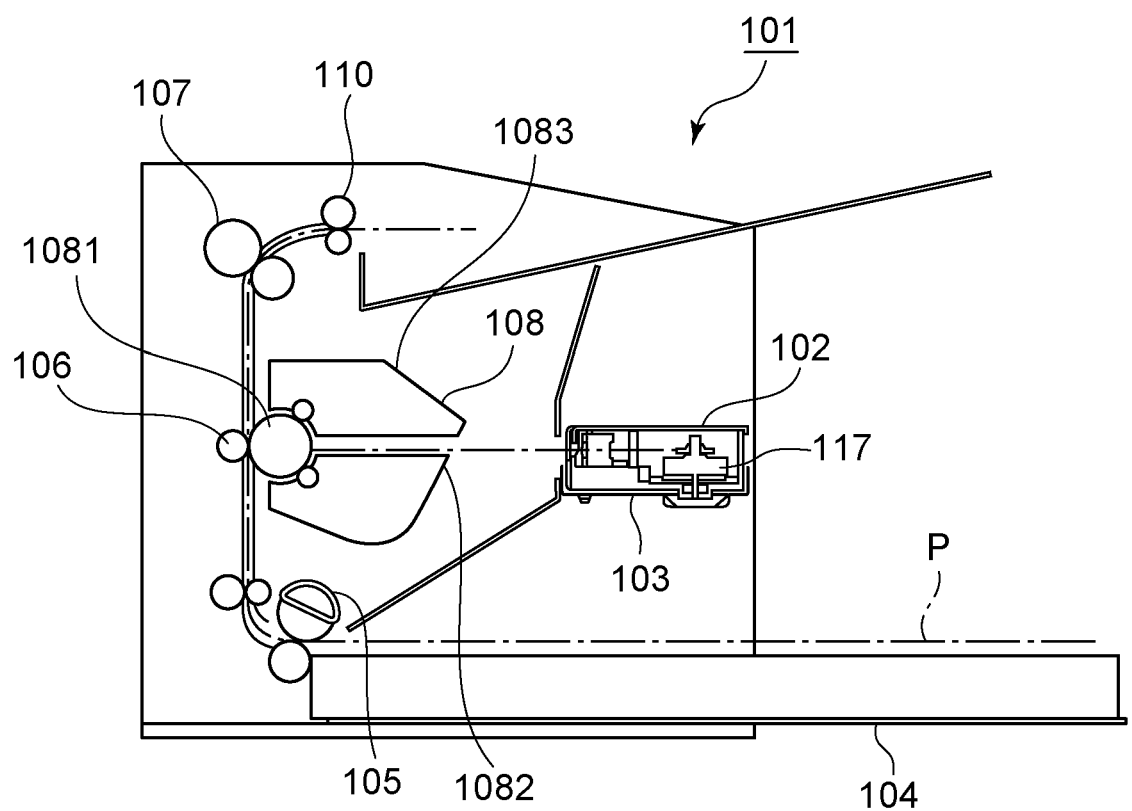
FIG. 1 is a cross-sectional view illustrating an image forming apparatus according to a first embodiment.

FIG. 1 is a view illustrating an image forming apparatus 101 that is an electrophotographic-type laser printer and uses an optical scanning device according to the first embodiment. Reference numeral 102 denotes the optical scanning device that is mounted on an optical base 103. The optical base 103 is part of the housing of the image forming apparatus 101. In addition, the image forming apparatus 101 includes a paper feed unit 104 on which transfer media P such as sheets of paper are placed, a feed roller 105, a transfer roller 106 that serves as a transfer device, and a fixing unit 107 that serves as a fixing device. Moreover, the image forming apparatus 101 includes an image forming device, such as a process cartridge 108, that is disposed at a position opposing the transfer roller 106 with a conveying path of transfer media interposed therebetween. The process cartridge 108 includes a photosensitive drum 1081 that serves as an image bearing member and a developing unit 1082 that develops an electrostatic image formed on the photosensitive drum 1081 into a toner image by using toner. The process cartridge 108 also includes a cleaner case 1083 that collects residual toner remaining on the photosensitive drum 1081 after a toner image is transferred onto a transfer medium P. A transfer medium P is fed from the paper feed unit 104 by the feed roller 105, and the toner image formed on the photosensitive drum 1081 is transferred onto the transfer medium P by the transfer roller 106. The toner image on the transfer medium P is subsequently fixed to the transfer medium P by applying heat and pressure at the fixing unit 107. The transfer medium P on which the toner image has been fixed is discharged out of the image forming apparatus 101 by a discharge roller 110.

Figure 2:
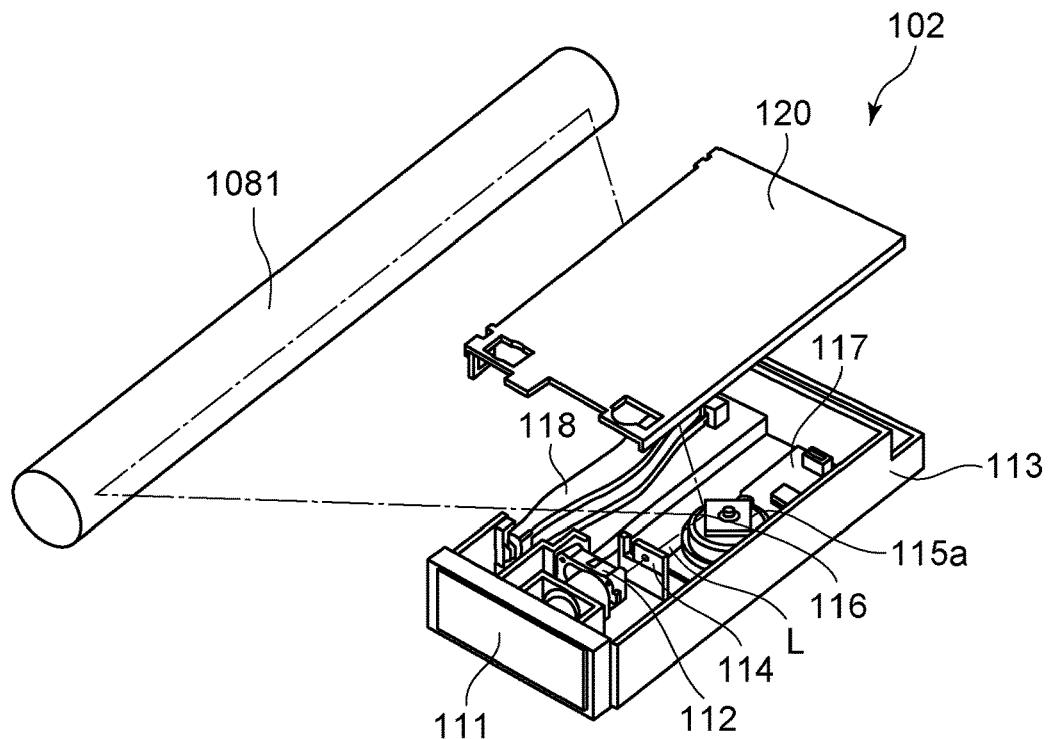
FIG. 2 is a perspective view illustrating an optical scanning device according to the first embodiment.

FIG. 2 is a perspective view illustrating an internal structure of the optical scanning device according to the first embodiment. A light source unit 111 having a semiconductor laser emits laser light, in other words, a laser beam L, and the laser beam L is condensed by a cylindrical lens 112 only in the sub scanning direction. The laser beam L is further narrowed down to a beam having a predetermined diameter by using an optical aperture 114 formed in the optical box 113 that is made of a black resin. The laser beam L is reflected by a laser light reflecting surface 116 of a rotatable polygon mirror 115a, which is part of a light deflector 117. The laser beam L is subsequently condensed to a line that extends in the main scanning direction. The rotatable polygon mirror 115a is rotatably driven by a motor, which is also part of the light deflector 117, thereby deflecting the incident laser beam L. The deflected laser beam L passes through an f0 lens 118 and is subsequently condensed and scanned on the photosensitive drum 1081, thereby forming an electrostatic image on the photosensitive drum 1081. An upper opening of the optical box 113 is covered with an optical lid 120 that is made of a resin or a metal sheet. The light deflector at least includes the rotatable polygon mirror and a support member that supports the rotatable polygon mirror. The optical scanning device at least includes the light deflector and a lens through which the deflected laser beam passes.

Figure 3:
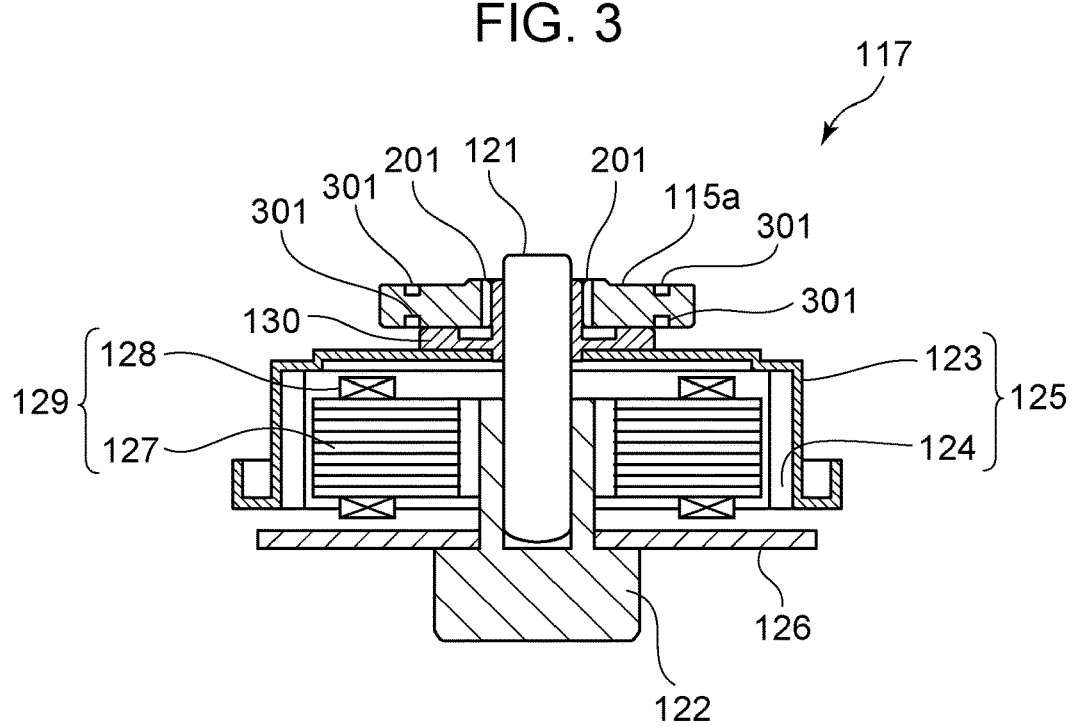
FIG. 3 is a cross-sectional view schematically illustrating an internal structure of a light deflector according to the first embodiment.

FIG. 3 is a cross-sectional view schematically illustrating an example of the internal structure of the light deflector 117 disposed in the optical scanning device according to the first embodiment. A drive motor that rotates the rotatable polygon mirror 115a includes a shaft 121 that is supported by a bearing 122. The drive motor also includes a flange portion 130, a yoke 123 joined integrally to the flange portion 130 by swaging or the like, and a rotor 125 having a rotor magnet 124. The drive motor further includes a circuit board 126 and a stator 129 that is fixed to the circuit board 126. The stator 129 includes a stator core 127 and a stator coil 128. The rotatable polygon mirror 115a is mounted on and fixed to the flange portion 130 that has the shaft 121 and rotates integrally with the shaft 121 and the rotor 125. The surface of the rotatable polygon mirror 115a that abuts the flange portion 130 when the rotatable polygon mirror 115a is mounted is referred to as the bottom surface of the rotatable polygon mirror 115a, and the surface opposite to the bottom surface is referred to as the top surface thereof. The rotatable polygon mirror 115a is made of an appropriate resin material, such as a polycarbonate resin or an acrylic resin. However, other resins or composite resins can be used.

Figure 4A:
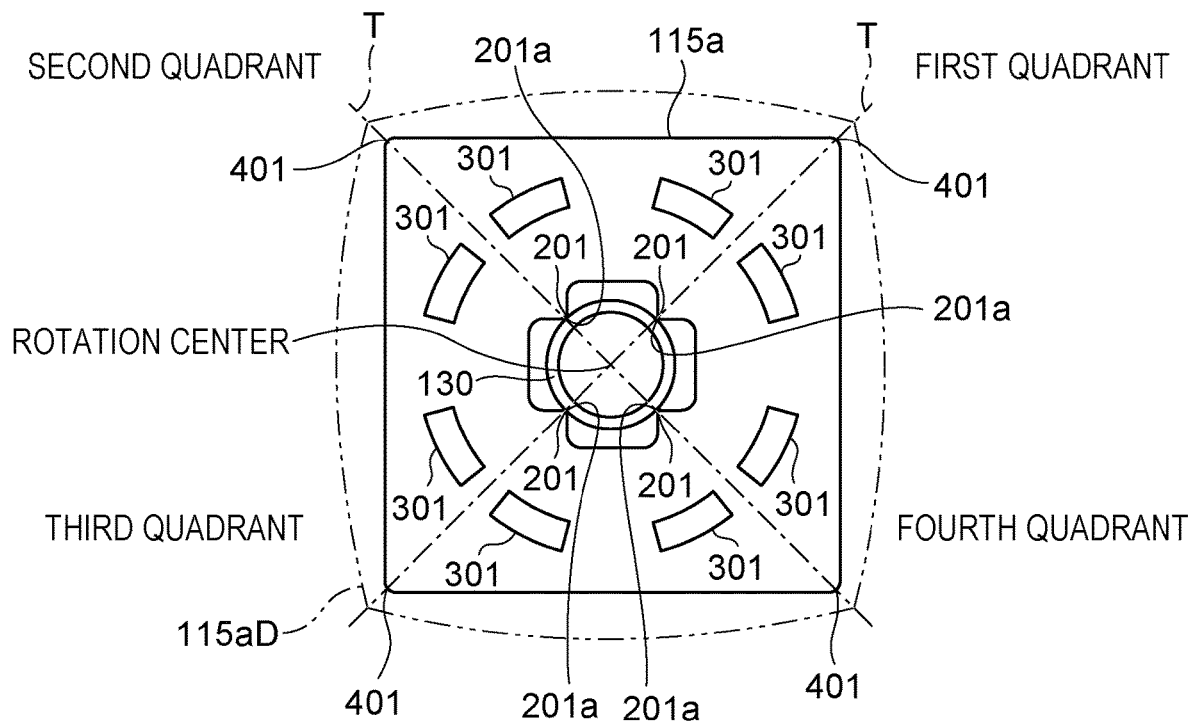
FIG. 4A is a diagram schematically illustrating a configuration of a rotatable polygon mirror according to the first embodiment.

FIG. 4A is a diagram schematically illustrating a configuration of the rotatable polygon mirror according to the first embodiment. In the description below, the shape of the rotatable polygon mirror that is made of a resin by using resin molding will be first described, followed by a description of a method of positioning the rotatable polygon mirror on the flange portion 130. The flange portion 130 serves as a support member that supports the rotatable polygon mirror that is made of a resin by using resin molding. The rotatable polygon mirror 115a according to the first embodiment is provided with a hole. The hole of the rotatable polygon mirror 115a has an inner surface that surrounds the support member when the rotatable polygon mirror 115a is mounted on the support member. Portions of the inner surface protrude toward the rotation center of the rotatable polygon mirror 115a, thereby forming a plurality of protruding portions 201. In addition, when the rotatable polygon mirror according to the first embodiment is viewed in the rotational axis direction, the rotatable polygon mirror has recesses 301 that are recessed in the rotational axis direction at symmetrical positions with respect to each straight line passing through the rotation center and a portion 201a at which each protruding portion is in contact with the support member. Moreover, when the rotatable polygon mirror is viewed in the rotational axis direction, a straight line can be drawn so as to pass through a portion 201a at which a protruding portion 201 protruding from the inner surface is in contact with the flange portion (i.e., support member) and through a corresponding one of corner portions 401 at which adjacent reflecting surfaces of the rotatable polygon mirror are connected to each other. In this case, the rotatable polygon mirror has the recesses, which are recessed in the rotational axis direction, at symmetrical positions with respect to each straight line passing through the portion 201a at which each protruding portion 201 is in contact with the support member and the corresponding one of the corner portions 401.

Figure 8A:
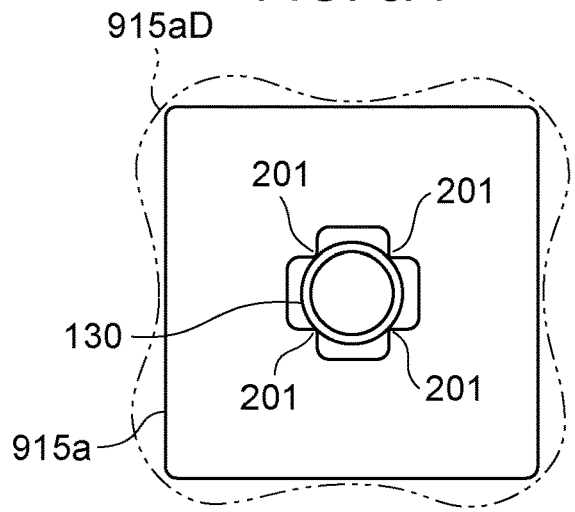
FIG. 8A is a diagram schematically illustrating a light deflector in a case in which the light deflector according to the first embodiment is not provided with recesses.

In the first embodiment, the rotatable polygon mirror having the hole is mounted onto the flange portion 130 (i.e., support member) in such a manner that each protruding portion of the rotatable polygon mirror is press-fitted against the flange portion 130 by an amount of several to several tens of micrometers. In this case, stress is generated near the root of each protruding portion 201 and is propagated radially. Accordingly, as the distance to the root of each protruding portion 201 becomes smaller on the reflecting surface, the amount of static surface deformation becomes larger. For example, when static surface deformation occurs on the reflecting surface as indicated by 915aD in FIG. 8A, the scanning speed in the main scanning direction does not become uniform, which leads to image degradation. In the present embodiment, the recesses 301 are disposed at symmetrical positions with respect to each straight line T that connects the rotation center of the rotatable polygon mirror 115a to each of the portions 201a at which the protruding portions 201 are in contact with the support member. For example, as illustrated in FIG. 4A, when the surface of the rotatable polygon mirror 115a is divided into four quadrant regions, from the first quadrant to the fourth quadrant, around the rotation center, the rotatable polygon mirror 115a has two recesses 301 within the first quadrant at symmetrical positions with respect to the straight line T. In the first embodiment, the rotatable polygon mirror 115a has two recesses in each quadrant.

Figure 4B:
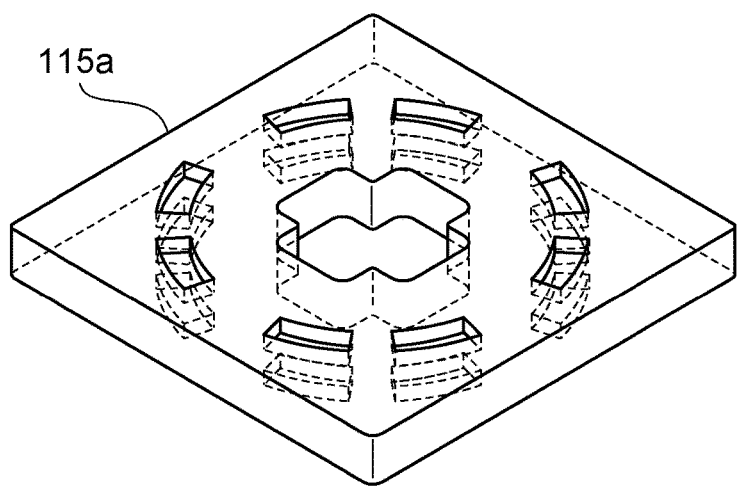
FIG. 4B is a perspective view illustrating the rotatable polygon mirror according to the first embodiment.

In the present embodiment, the portion 201a of each protruding portion 201, which comes into contact with the flange portion (i.e., support member), is the top end of the protruding portion. The recesses 301 are recessed in the rotational axis direction when the rotatable polygon mirror is viewed in the rotational axis direction. In addition, as illustrated in FIG. 4B, the recesses 301 are disposed on both the top surface and the bottom surface of the rotatable polygon mirror 115a. The bottoms of the recesses 301 are positioned opposite to the bottoms of the recesses 301 of the opposite surface. The opening of each recess 301 opens in the rotational axis direction and in a direction away from the center in depth of the rotatable polygon mirror 115a. The rigidity of the rotatable polygon mirror, which is made by resin molding, is lowered at regions where a plurality of the recesses 301 is provided. The stress can be thereby distributed in the directions to regions in which the recesses 301 are not provided. Accordingly, providing the recesses 301 in the rotatable polygon mirror can bring the unevenness of the reflecting surface in line with a desired shape as indicated by reference 115aD in FIG. 4A. The rotatable polygon mirror 115a according to the present embodiment is produced in such a manner that a resin molding piece is produced first by injecting a resin into a die and subsequently portions of the resin molding piece that become reflecting surfaces are coated with aluminum (a metallic material) by using vacuum deposition.

Second Embodiment

Figure 5A:
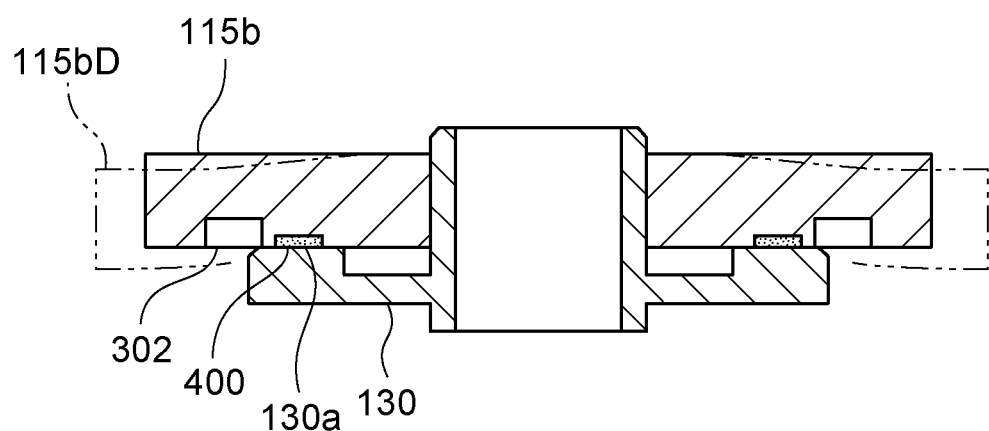
FIG. 5A is a cross-sectional view illustrating a rotatable polygon mirror according to a second embodiment and a support member to which the rotatable polygon mirror is attached.

Next, the second embodiment will be described. FIG. 5A is a cross-sectional view illustrating a rotatable polygon mirror 115b according to the second embodiment when the rotatable polygon mirror 115b is mounted. As illustrated in FIG. 5A, the rotatable polygon mirror 115b is attached onto the flange portion of the support member by using an adhesive. The support member has a contact portion 130a that is in contact with the rotatable polygon mirror 115b via the adhesive. The rotatable polygon mirror 115b has an adhesion portion 400 that is fixed to the support member via the adhesive.

Figure 5B:
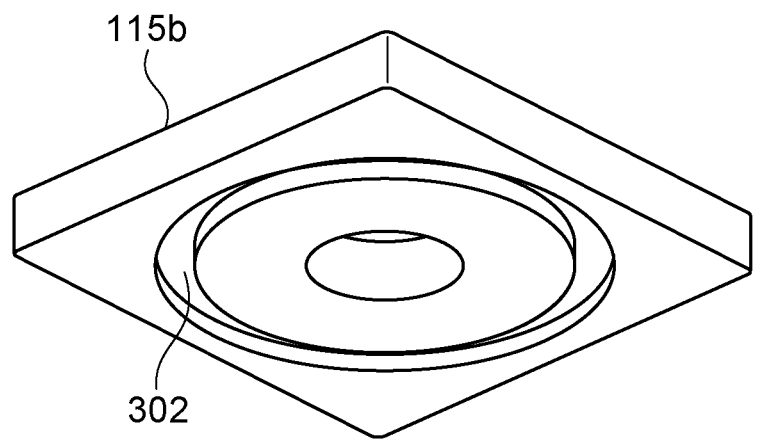
FIG. 5B is a perspective view illustrating the rotatable polygon mirror according to the second embodiment.
Figure 8B:
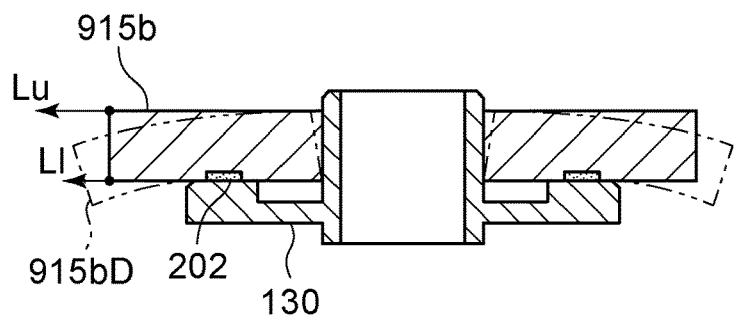
FIG. 8B is a diagram schematically illustrating a light deflector in a case in which the light deflector according to the second embodiment is not provided with recesses.

When centrifugal forces act on the rotatable polygon mirror 115b, the centrifugal forces affect a peripheral portion outside the adhesion portion 400 on the adhesion side (bottom surface) of the rotatable polygon mirror 115b that is fixed to the supporting member. Accordingly, the amount of dynamic deformation of the rotatable polygon mirror becomes small on the adhesion side (bottom surface) that faces the support member, whereas the amount of dynamic deformation becomes large on a non-adhesion side (top surface) that does not face the support member. For example, as illustrated in FIG. 8B, Lu becomes larger than Ll, where Lu and Ll are the amounts of dynamic deformation of the rotatable polygon mirror 115b on the non-adhesion side (top surface) and on the adhesion side (bottom surface), respectively. As a result, the reflecting surfaces of the rotatable polygon mirror 115b are inclined as indicated by reference 915bD in FIG. 8B. The reflecting surfaces become more susceptible to the influence of eccentricity, leading to the likelihood of the nonuniformity of an image occurring in the sub scanning direction. As illustrated in FIG. 5B, the rotatable polygon mirror 115b according to the present embodiment has an annular recess 302 on the surface (bottom surface) on which the adhesion portion is provided. The annular recess 302 is provided at a position between the adhesion portion 400 and the reflecting surfaces that reflect laser light. The annular recess 302 is recessed in the rotational axis direction at a position more distant than the adhesion portion 400 from the rotation center of the rotatable polygon mirror 115b. The annular recess is provided outside the adhesion portion so as to surround the adhesion portion that is annularly adhered to the support member. With respect to the contact portion 130a of the flange portion (i.e., support member), the annular recess is provided at a position more distant than the contact portion 130a from the rotation center of the rotatable polygon mirror 115b in the radial direction thereof. In other words, the contact portion 130a of the support member is disposed at a position closer than the annular recess to the rotation center.

Providing the annular recess 302 in such a manner can lower the rigidity of the rotatable polygon mirror in the radial direction on the adhesion side where the amount of dynamic deformation due to the centrifugal force is small. The adhesion side and the non-adhesion side of the rotatable polygon mirror deforms toward the perimeter thereof, and the annular recess 302 can adjust the amounts of dynamic deformation of the adhesion side and of the non-adhesion side. Thus, inclination of the reflecting surfaces can be mitigated as indicated by reference 115bD in FIG. 5A.

Third Embodiment

Figure 6A:
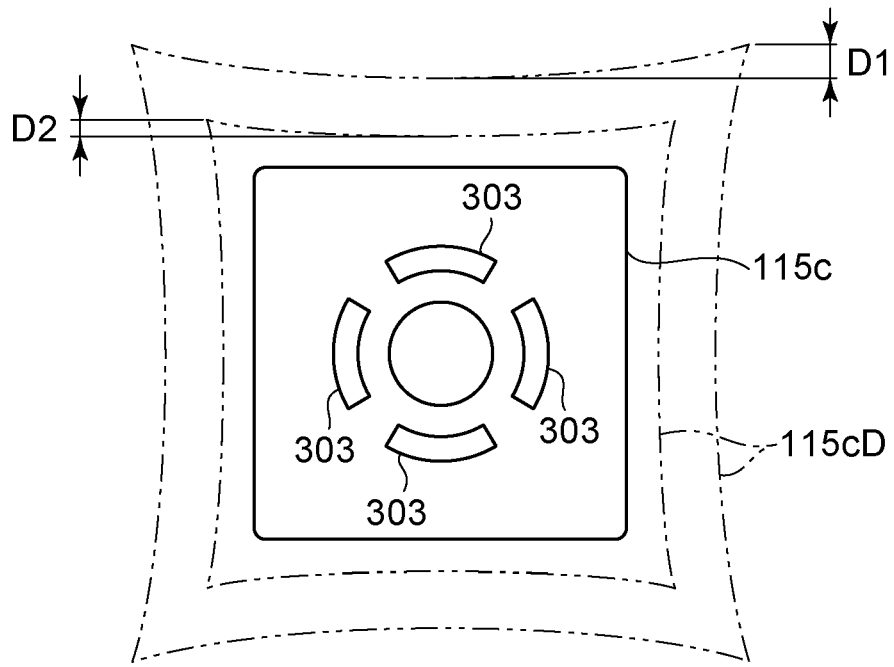
FIG. 6A is a diagram illustrating a configuration of a rotatable polygon mirror according to a third embodiment.
Figure 6B:
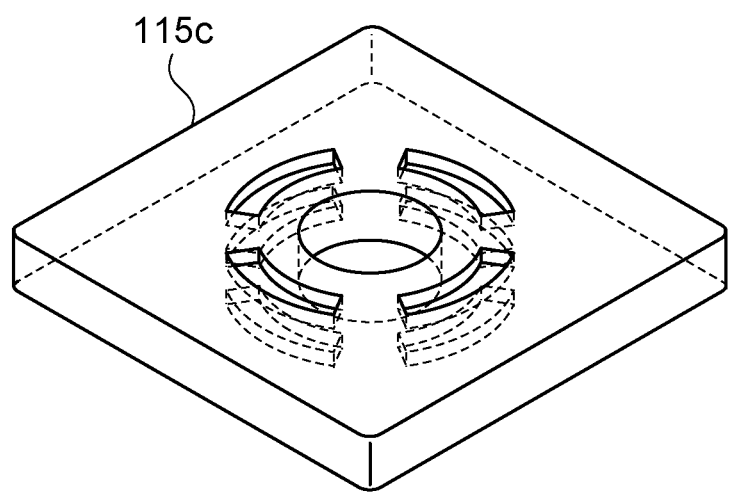
FIG. 6B is a perspective view illustrating the rotatable polygon mirror according to the third embodiment.

Next, the third embodiment will be described. FIG. 6A is a diagram schematically illustrating a configuration of the rotatable polygon mirror 115c according to the third embodiment. The corner portions of the rotatable polygon mirror 115c are more susceptible to the influence of centrifugal forces because the radius of rotation is large. For example, in FIG. 8C, the amount of dynamic deformation becomes larger at the corner portions at which adjacent reflecting surfaces are joined to each other than at the center portions of the reflecting surfaces as indicated by reference 915cD. This may lead to an image degradation due to out-of-focus image forming in the main scanning direction or a change in image magnification or the like. The rotatable polygon mirror 115c according to the present embodiment has recesses 303 at positions in phase with the respective reflecting surfaces with respect to the rotation center. In other words, the rotatable polygon mirror 115c according to the present embodiment has recesses 303 at positions between the corner portions at which adjacent reflecting surfaces are joined to each other. As illustrated in FIG. 6A, a straight line that passes through the rotation center and the center of a recess also passes between the corner portions. In addition, four recesses 303 (a plurality of recesses) are provided at symmetrical positions with respect to the rotation center. The recesses 303 provided on the top surface (first surface) of the rotatable polygon mirror 115c are referred to as "first recesses", and the recesses 303 provided on the bottom surface (surface opposite to the first surface) of the rotatable polygon mirror 115c are referred to as "second recesses". As illustrated in FIG. 6B, the second recesses are disposed at positions corresponding to the first recesses, and both the second recesses and the first recesses are provided at symmetrical positions with respect to the rotation center of the rotatable polygon mirror 115c. The bottoms of the first recesses are disposed so as to oppose the bottoms of the second recesses. The number of recesses is more than or equal to the number of corner portions and is preferably less than or equal to four times the number of corner portions. If the number of recesses is more than four times the number of corner portions, recesses to be formed become many, and arranging the recesses requires precision processing. In the third embodiment, four recesses, which is the same as the number of the corner portions, are provided on a single surface of the rotatable polygon mirror, and the same number of recesses are also provided on the opposite surface. Accordingly, the rotatable polygon mirror 115c according to the third embodiment has a total of eight recesses, which is twice as many as the corner portions. Thus, the number of recesses is more than or equal to the number of corner portions and less than or equal to four times the number of corner portions.

As illustrated in FIGS. 6A and 6B, when centrifugal forces act on the rotatable polygon mirror 115c during rotation, the recess 303 provided in phase with each reflecting surface lowers the rigidity of the rotatable polygon mirror 115c in the radial direction at the central portion of the reflecting surface and thereby reduces the difference between the amounts of dynamic deformation of the central portion of the reflecting surface and of the corner portions. In other words, the central portions of the reflecting surfaces can absorb the deformation of the corner portions of the rotatable polygon mirror 115c at which the centrifugal forces are large and accordingly the amounts of dynamic deformation in the radial direction are large.

Figure 8C:
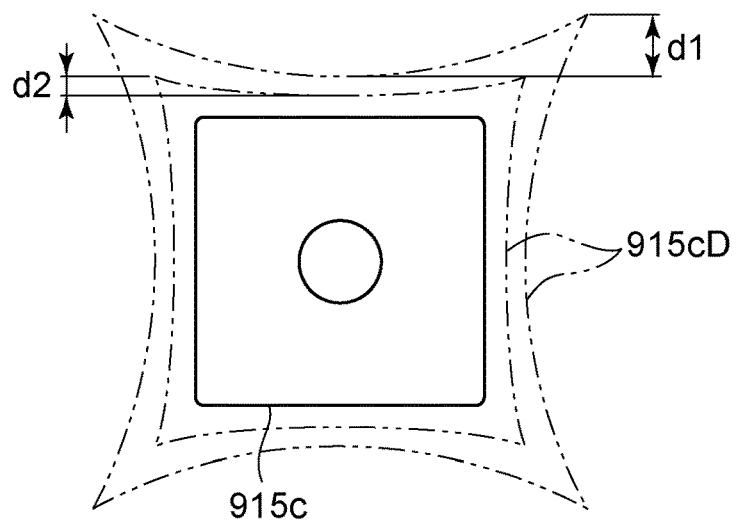
FIG. 8C is a diagram schematically illustrating a light deflector in a case in which the light deflector according to the third embodiment is not provided with recesses.
Figure 9:
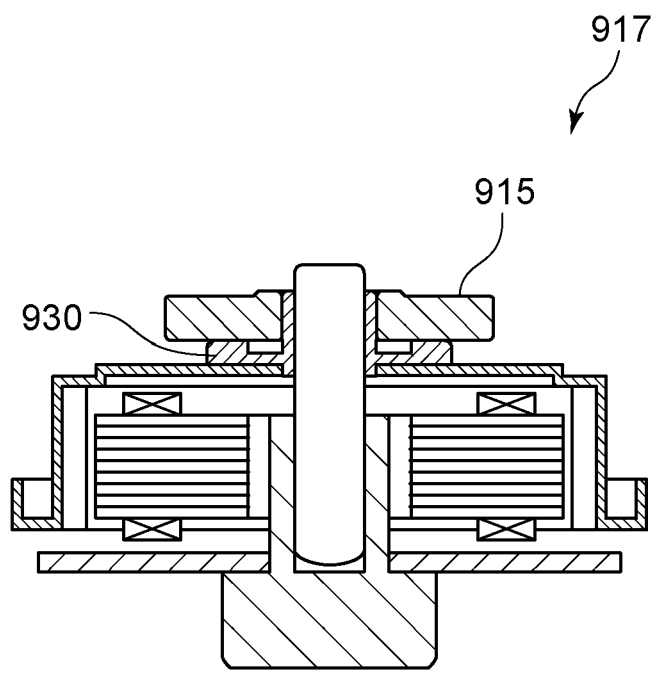
FIG. 9 is a cross-sectional view schematically illustrating an internal structure of a known light deflector.
Figure 10:
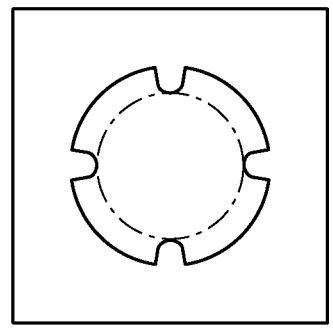
FIG. 10 is a diagram schematically illustrating known rotatable polygon mirrors.
Figure 10:
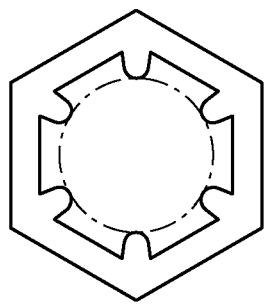
Figure 10:
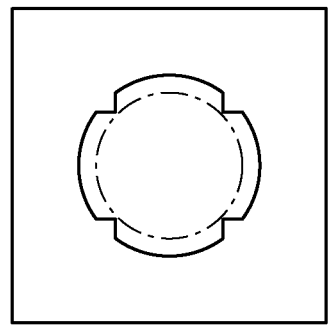
Figure 10:
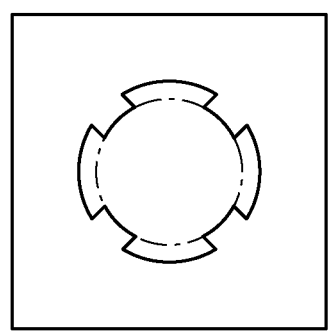
Figure 11:
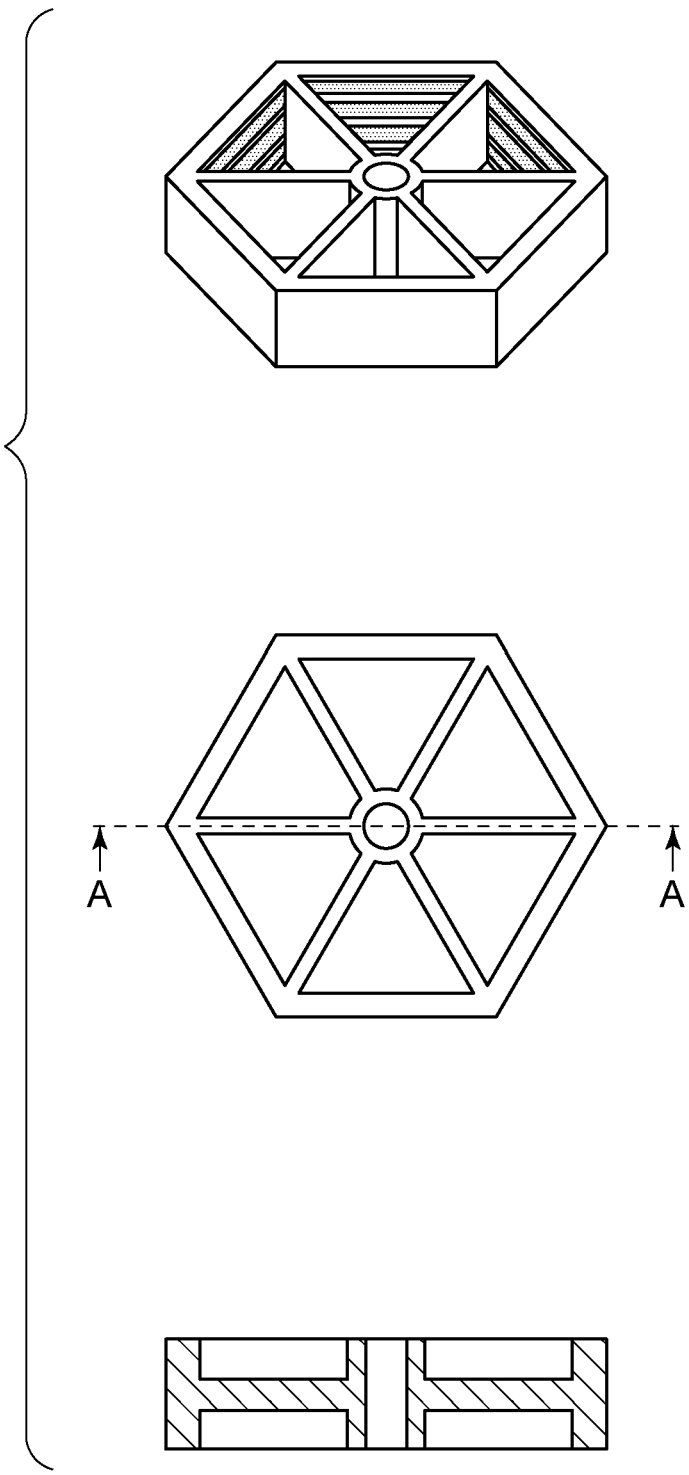
FIG. 11 is a diagram schematically illustrating another known rotatable polygon mirror.

As a result, the differences d1 and d2 in FIG. 8C can be reduced to the differences D1 and D2 in FIG. 6A because of the recesses 303. Thus, a single rotatable polygon mirror 115c can work readily for multiple rotation rates.

Fourth Embodiment

Figure 7A:
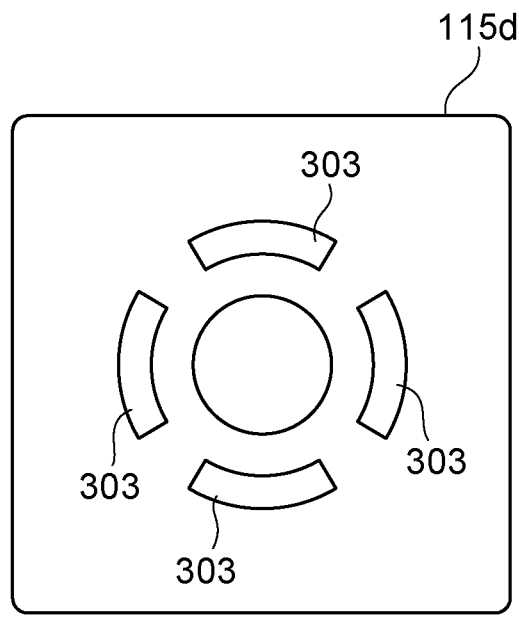
FIG. 7A is a diagram schematically illustrating the top surface of a rotatable polygon mirror according to a fourth embodiment.
Figure 7B:
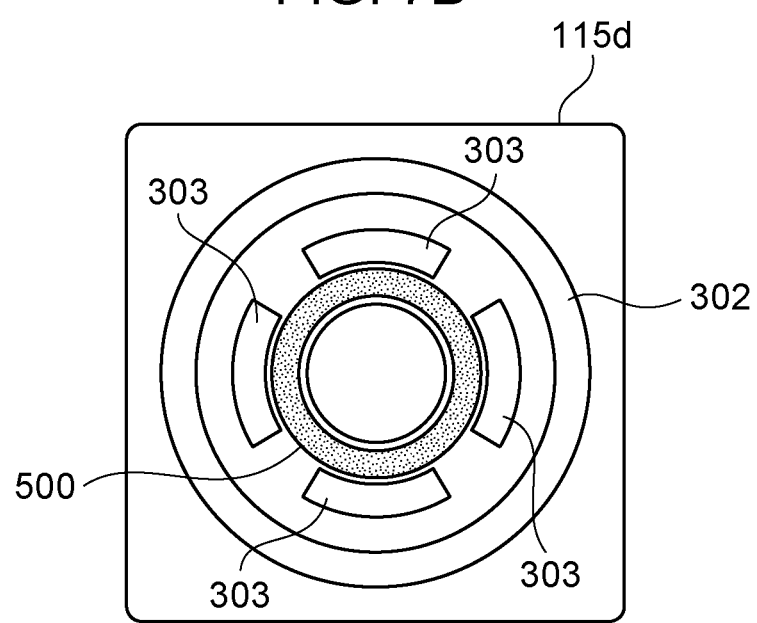
FIG. 7B is a diagram schematically illustrating the bottom surface of the rotatable polygon mirror according to the fourth embodiment.

Next, the fourth embodiment will be described. FIG. 7A is a diagram schematically illustrating the top surface of a rotatable polygon mirror according to the fourth embodiment (when the rotatable polygon mirror is viewed in the rotational axis direction). FIG. 7B is a diagram schematically illustrating the bottom surface (i.e., surface opposite to the top surface) of the rotatable polygon mirror according to the fourth embodiment (when the rotatable polygon mirror is viewed in the rotational axis direction). The centrifugal forces affect a peripheral portion outside the adhesion portion on the adhesion side (bottom surface) of the rotatable polygon mirror 115d that is fixed to the supporting member. Accordingly, the amount of dynamic deformation of the rotatable polygon mirror becomes small on the adhesion side (bottom surface) thereof, whereas the amount of dynamic deformation becomes large on the non-adhesion side (top surface). For example, in FIG. 8B, Lu becomes larger than Ll, where Lu and Ll are the amounts of dynamic deformation of the rotatable polygon mirror on the non-adhesion side (top surface) and on the adhesion side (bottom surface), respectively. As a result, the reflecting surfaces are inclined as indicated by reference 915bD. The reflecting surfaces thereby become more susceptible to the influence of eccentricity, leading to the nonuniformity of an image in the sub scanning direction. In the present embodiment, the rotatable polygon mirror 115d is provided with the openings of the recesses on the surface at the bottom (bottom surface) on which the adhesion portion is provided. The rotatable polygon mirror 115d is also provided with an annular recess 302 as illustrated in FIG. 7B on the same surface at a position between the adhesion portion 500 and the reflecting surfaces. Providing the annular recess 302 can lower the rigidity of the rotatable polygon mirror in the radial direction on the adhesion side where the amount of dynamic deformation due to the centrifugal force is small. Accordingly, the annular recess 302 can adjust the amount of dynamic deformation of the adhesion side that deforms toward the perimeter of the rotatable polygon mirror. Thus, inclination of the reflecting surfaces can be mitigated as described in the second embodiment.

As illustrated in FIGS. 7A and 7B, the corner portions of the rotatable polygon mirror 115d are more susceptible to the influence of centrifugal forces because the radius of rotation is large. For example, in FIG. 8C, the amount of dynamic deformation due to the centrifugal force becomes larger at the corner portions than at the center portions of the reflecting surfaces as indicated by reference 915cD. This leads to an image degradation, such as out-of-focus image forming in the main scanning direction or a change in image magnification. The rotatable polygon mirror 115d according to the present embodiment has recesses 303 provided in such a manner that each recess 303 intersects a straight line that passes through the rotation center and intersects a straight line that connects two opposing corner portions to each other. In other words, when the rotatable polygon mirror 115d rotates around the rotation center, the recesses are provided in phase with the respective reflecting surfaces. In addition, a straight line that passes through the rotation center and the center of a recess passes between the adjacent corner portions and also passes through the center of a reflecting surface. Moreover, as illustrated in FIG. 7B, the recesses 303 are provided on both the top surface and the bottom surface of the rotatable polygon mirror 115d. As illustrated in FIGS. 7A and 7B, the recesses 303 are provided in phase with reflecting surfaces. When centrifugal forces act on the rotatable polygon mirror 115d during rotation, each recess 303 can lower the rigidity of the central portion of the reflecting surface in the radial direction of the rotatable polygon mirror 115d and thereby reduce the difference between the amounts of dynamic deformation of the central portion of the reflecting surface and the corner portions. In other words, the difference between the amounts of dynamic deformation is reduced because the central portions of the reflecting surfaces can absorb the deformation of the corner portions of the rotatable polygon mirror 115d where the centrifugal forces are large and accordingly the amounts of dynamic deformation in the radial direction are large. As a result, the differences d1 and d2 in FIG. 8C can be reduced to the differences D1 and D2 in FIG. 6A by disposing the recesses 303. Thus, a single rotatable polygon mirror 115d can work readily for multiple rotation rates. Thus, the rotatable polygon mirror according to the present embodiment can simultaneously suppress inclination and deformation of the reflecting surfaces caused by centrifugal forces during rotation.

According to aspects of the present disclosure, deformation of reflecting surfaces of a rotatable polygon mirror can be reduced by disposing recesses in the rotatable polygon mirror that is formed by using resin molding, and thereby a high-precision image can be obtained.

While aspects of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-210533 filed Oct. 31, 2017, which is hereby incorporated by reference herein in its entirety.

What is claimed is:

1. A light deflector comprising:
a rotatable polygon mirror that is formed by resin molding and has reflecting surfaces that deflect laser light; and
a support member that supports the rotatable polygon mirror, wherein
the rotatable polygon mirror is provided with a hole and the hole has an inner surface that surrounds the support member,
the inner surface includes a plurality of protruding portions that protrude from the inner surface toward a rotation center of the rotatable polygon mirror and are in contact with the support member,
the rotatable polygon mirror has recesses that are (i) recessed in a rotational axis direction of the rotatable polygon mirror and (ii) provided at symmetrical positions with respect to a straight line that passes through the rotation center and a portion at which each of the protruding portions is in contact with the support member as viewed in the rotational axis direction,
the rotatable polygon mirror includes, as viewed in a direction perpendicular to the rotational axis direction, a part of the rotational polygon mirror at a position between the recess and a surface opposite a surface provided with an opening of the recess of the rotatable polygon mirror, wherein a distance from the rotation center of the rotatable polygon mirror in a radial direction to the position being equal to a distance from the rotation center of the rotatable polygon mirror in a radial direction to a position where the recess is provided, and when the recesses are first recesses, the rotatable polygon mirror further includes second recesses that are provided in a surface opposite to a surface in which the first recesses are provided and that are recessed in the rotational axis direction.

2. The light deflector according to claim 1, wherein the number of the recesses is more than or equal to the number of corner portions of the rotatable polygon mirror and less than or equal to four times the number of the corner portions.

3. The light deflector according to claim 1, wherein the support member has a contact portion that is in contact with a lower surface of the rotatable polygon mirror, and
the contact portion is disposed at a position closer than the recesses to the rotation center of the rotatable polygon mirror.

4. An optical scanning device, comprising:
the light deflector according to claim 1;
a light source unit that emits laser light to be deflected by the light deflector; and
a lens through which deflected laser light passes.

5. An image forming apparatus comprising:
the light deflector according to claim 1;
a photosensitive drum on which an electrostatic image is formed by laser light; and
a developing unit that develops the electrostatic image into a toner image by using toner.

6. A light deflector comprising:
a rotatable polygon mirror that is formed by resin molding and has reflecting surfaces that deflect laser light; and
a support member that supports the rotatable polygon mirror, wherein
the rotatable polygon mirror is provided with a hole and the hole has an inner surface that surrounds the support member,
the inner surface includes a plurality of protruding portions that protrude from the inner surface toward a rotation center of the rotatable polygon mirror and are in contact with the support member,
the rotatable polygon mirror has recesses that are (i) recessed in a rotational axis direction of the rotatable polygon mirror and (ii) provided at symmetrical positions with respect to a straight line that passes through a portion at which each of the protruding portions is in contact with the support member and a corresponding one of the corner portions at which adjacent reflecting surfaces of the rotatable polygon mirror are joined to each other as viewed in the rotational axis direction,
the rotatable polygon mirror includes, as viewed in a direction perpendicular to the rotational axis direction, a part of the rotational polygon mirror at a position between the recess and a surface opposite a surface provided with an opening of the recess of the rotatable polygon mirror, wherein a distance from the rotation center of the rotatable polygon mirror in a radial direction to the position being equal to a distance from the rotation center of the rotatable polygon mirror in a radial direction to a position where the recess is provided, and when the recesses are first recesses, the rotatable polygon mirror further includes second recesses that are provided in a surface opposite to a surface in which the first recesses are provided and that are recessed in the rotational axis direction.

7. A light deflector comprising:
a rotatable polygon mirror that is formed by resin molding and has reflecting surfaces that deflect laser light, the reflecting surfaces being provided on a periphery of the rotatable polygon mirror, wherein
the rotatable polygon mirror has first recesses that are (i) recessed in a rotational axis direction and (ii) provided at symmetrical positions with respect to the rotation center of the rotatable polygon mirror as viewed in the rotational axis direction,
the rotatable polygon mirror has second recesses that are recessed in the rotational axis direction and provided at positions corresponding to the first recesses in a surface that is opposite to a surface on which the rotatable polygon mirror has the first recesses, and
the rotatable polygon mirror includes, as viewed in a direction perpendicular to the rotational axis direction, a part of the rotational polygon mirror at a position between the first recesses and the second recesses.

8. A rotatable polygon mirror made of resin comprising:
reflecting surfaces that deflect laser light; and
a hole provided at a rotation center of the rotatable polygon mirror into which a support member is inserted,
wherein an inner surface of the hole includes a plurality of protruding portions that protrude from the inner surface toward the rotation center of the rotatable polygon mirror,
wherein the rotatable polygon mirror has recesses that are (i) recessed in a rotational axis direction of the rotatable polygon mirror and (ii) provided at symmetrical positions with respect to a straight line that passes through the rotation center and the protruding portions as viewed in the rotational axis direction,
wherein the rotatable polygon mirror includes, as viewed in a direction perpendicular to the rotational axis direction, a part of the rotational polygon mirror at a position between the recess and a surface opposite a surface provided with an opening of the recess of the rotatable polygon mirror, wherein a distance from the rotation center of the rotatable polygon mirror in a radial direction to the position being equal to a distance from the rotation center of the rotatable polygon mirror in a radial direction to a position where the recess is provided, and
wherein when the recesses are first recesses, the rotatable polygon mirror further includes second recesses that are provided in a surface opposite to a surface in which the first recesses are provided and that are recessed in the rotational axis direction.

9. The mirror according to claim 8, wherein
the number of the recesses is more than or equal to the number of corner portions of the rotatable polygon mirror and less than or equal to four times the number of the corner portions.

10. A rotatable polygon mirror made of resin comprising:
reflecting surfaces that deflect laser light; and
a hole provided at a rotation center of the rotatable polygon mirror into which a support member is inserted,
wherein an inner surface of the hole includes a plurality of protruding portions that protrude from the inner surface toward a rotation center of the rotatable polygon mirror,
wherein the rotatable polygon mirror has recesses that are (i) recessed in a rotational axis direction of the rotatable polygon mirror and (ii) provided at symmetrical positions with respect to a straight line that passes through each of the protruding portions and a corresponding one of the corner portions at which adjacent reflecting surfaces of the rotatable polygon mirror are joined to each other as viewed in the rotational axis direction,
wherein the rotatable polygon mirror includes, as viewed in a direction perpendicular to the rotational axis direction, a part of the rotational polygon mirror at a position between the recess and a surface opposite a surface provided with an opening of the recess of the rotatable polygon mirror, wherein a distance from the rotation center of the rotatable polygon mirror in a radial direction to the position being equal to a distance from the rotation center of the rotatable polygon mirror in a radial direction to a position where the recess is provided, and
wherein when the recesses are first recesses, the rotatable polygon mirror further includes second recesses that are provided in a surface opposite to a surface in which the first recesses are provided and that are recessed in the rotational axis direction.

11. A rotatable polygon mirror made of resin comprising:
reflecting surfaces that deflect laser light, the reflecting surfaces being provided on a periphery of the rotatable polygon mirror,
wherein the rotatable polygon mirror has first recesses that are (i) recessed in a rotational axis direction and (ii) provided at symmetrical positions with respect to the rotation center of the rotatable polygon mirror as viewed in the rotational axis direction,
wherein the rotatable polygon mirror has second recesses that are recessed in the rotational axis direction and provided at positions corresponding to the first recesses in a surface that is opposite to a surface on which the rotatable polygon mirror has the first recesses, and
wherein the rotatable polygon mirror includes, as viewed in the rotational axis direction, a part of the rotational polygon mirror at a position between the first recesses and the second recesses.

* * * * *